(12) United States Patent
Uenaka et al.

(10) Patent No.: US 6,946,649 B2
(45) Date of Patent: Sep. 20, 2005

(54) ROTARY ENCODER AND POSITION ADJUSTER THEREFOR

(75) Inventors: Yukio Uenaka, Tokyo (JP); Kazuhiro Hattori, Chiba (JP)

(73) Assignee: PENTAX Corporation, Tokyo (JP)

(*) Notice: Subject to any disclaimer, the term of this patent is extended or adjusted under 35 U.S.C. 154(b) by 100 days.

(21) Appl. No.: 10/664,980

(22) Filed: Sep. 22, 2003

(65) Prior Publication Data
US 2004/0057723 A1 Mar. 25, 2004

(30) Foreign Application Priority Data
Sep. 20, 2002 (JP) .................................... P2002-274445

(51) Int. Cl.$^7$ .......................... G01D 5/34; H03M 11/00; G03B 17/00; G03B 7/099
(52) U.S. Cl. ............................. 250/231.13; 250/231.16; 341/13; 33/1 PT; 396/55; 396/269
(58) Field of Search ........................ 250/231.13–231.18; 396/661, 269, 55; 356/616, 617; 341/11, 13, 31; 33/1 N, 1 PT

(56) References Cited

U.S. PATENT DOCUMENTS 4,193,199 A * 3/1980 Whiteley et al. ........... 33/1 PT
5,416,558 A   5/1995 Katayama et al.

* cited by examiner

*Primary Examiner*—David Porta
*Assistant Examiner*—Suezu Ellis
(74) *Attorney, Agent, or Firm*—Greenblum & Bernstein, P.L.C.

(57) ABSTRACT

A rotary encoder has a disc, a pair of photo-interrupters, an adjusting member, and a shifting controller. The disc rotates around a rotating axis and has slits that are formed circumferentially at given intervals. Each of the photo-interrupters has a light-emitting device and a photo-detecting device opposite one another, and generates two signals with a phase difference. Each photo-interrupter is pivotable around a pivot coaxial with the rotating axis, and is arranged along the circumferential direction of the disc so as to position the slits between the light-emitting device and the photo-detector. The adjusting member contacts the pair of photo-interrupters, and is movable along a shifting direction corresponding to a radial direction of the disc, so as to engage the pair of photo-interrupters. The adjusting member adjusts a relative position-relationship between the pair of photo-interrupters associated with the phase difference. The shifting controller shifts the adjusting member along the shifting direction to set the phase difference to a predetermined phase difference.

16 Claims, 5 Drawing Sheets

ROTARY ENCODER AND POSITION ADJUSTER THEREFOR

BACKGROUND OF THE INVENTION

1. Field of the Invention

The present invention relates to a rotary encoder, especially, relates to a position-adjustment of photo-interrupters provided in the rotary encoder.

2. Description of the Related Art

Generally, a rotary encoder has a rotating disc and a pair of photo-interrupters, and detects a rotation position, namely, rotation-angle of a rotating member, such as a DC motor. The rotating disc rotates around a rotating-axis of the rotating member in accordance with the rotation of the rotating motor. The disc has slits, which are formed circumferentially at constant intervals, and is journaled around the rotating-axis. Each of the pair of photo-interrupters has a light-emitting device such as an LED, and a photo-detector such as a photo-diode. Then, each photo-interrupter is positioned so as to put the slits between the light-emitting device and the photo-detector.

When the DC motor rotates, the slits pass through the light-path between the light-emitting device and the photo-detector. Consequently, a sequence of pulse signals is output from each of the pair of photo-interrupters. The pair of photo-interrupters is positioned such that a phase deference between two sequences of pulse signals occurs, thus a rotation-amount and a rotation direction, namely, the rotation position of the disc is detected. The DC motor is controlled on the basis of the detected rotation position.

Since the rotation position is detected in accordance with the phase difference between two pulse signals, the precision of the detected position depends upon the relative position-relationship between the two photo-interrupters. However, the precision of the size or the form is different in each photo-interrupter. When the pair of photo-interrupters is not positioned at a desired place precisely, the rotation-position cannot be detected correctly.

SUMMARY OF THE INVENTION

An object of the present invention is to provide a rotary encoder that is capable of detecting a rotation-position correctly by precisely adjusting the position of the pair of photo-interrupters. The rotary encoder has a disc, a pair of photo-interrupters, an adjusting member, and a shifting controller. The disc rotates around a rotating axis and has slits that are formed circumferentially at given intervals. The pair of photo-interrupters respectively have a light-emitting device and a photo-detecting device opposite to each other, and generates two signals with a phase difference. Each photo-interrupter is pivotable around a pivot coaxial to the rotating axis. Each photo-interrupter is arranged along the circumferential direction of the disc so as to position the slits between the light-emitting device and the photo-detector. The adjusting member contact the pair of photo-interrupters, and is movable along a shifting direction corresponding to a radial direction of the disc, so as to press the pair of photo-interrupters. The adjusting member adjusts a relative position-relationship between the pair of photo-interrupters associated with the phase difference. The shifting controller shifts the adjusting member along the shifting direction to set the phase difference to a predetermined phase difference.

A position adjuster according to another aspect of the present invention is an adjuster for a pair of photo-interrupters incorporated in a rotary encoder with a disc, which rotates around a rotating axis and has slits. The position adjuster includes an adjusting member and a shifting controller. The adjusting member contact the pair of photo-interrupters, and is movable along a shifting direction corresponding to a radial direction of the disc so as to press the pair of photo-interrupters. The adjusting member adjusts a relative position-relationship between the pair of photo-interrupters associated with the phase difference. The shifting controller shifts the adjusting member along the shifting direction to set the phase difference to a predetermined phase difference.

BRIEF DESCRIPTION OF THE DRAWINGS

The present invention will be better understood from the description of the preferred embodiment of the invention set forth below together with the accompanying drawing, in which.

DESCRIPTION OF THE PREFERRED EMBODIMENTS

Hereinafter, a preferred embodiment of the present invention is described with reference to the attached drawings.

Figure 1:
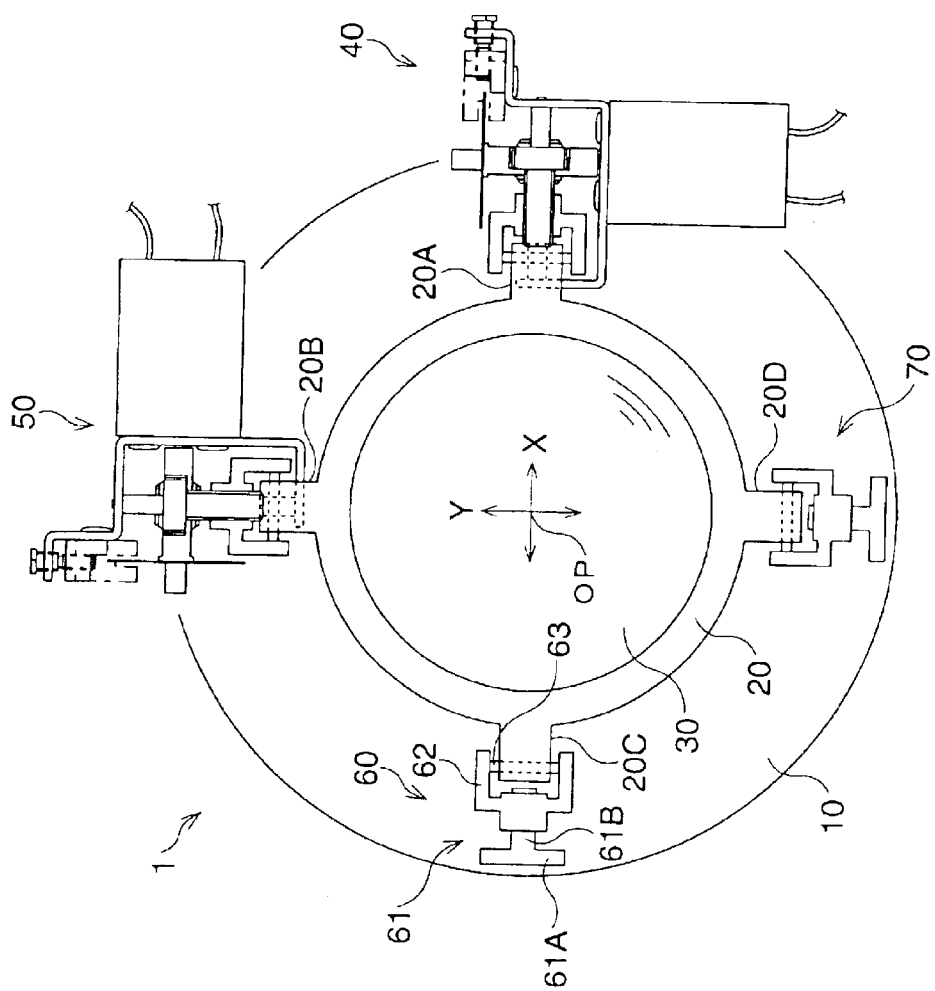
FIG. 1 is schematic front view of a hand-tremble correcting device incorporating a rotary encoder according to an embodiment of the present invention.

FIG. 1 is a schematic front view of a hand-tremble correcting device according to the embodiment.

A hand-tremble correcting apparatus 1, incorporated in a camera (not shown), has a fixed-ring 10, a lens-supporting frame 20, and a correcting lens 30. The fixed-ring 10 is fixed to the inside surface of a lens barrel (not shown). The correcting lens 30 is provided as a part of photographing optical system and is accommodated within the ring-shaped lens-supporting frame 20. The lens-supporting frame 20 has four flanges 20A, 20B, 20C, 20D, which are arranged at constant intervals along the circumference of the lens-supporting frame 20.

The correcting lens 30 is an optical device for correcting the hand tremble in such a manner that the lens 30 moves so as to counterbalance the tremble effect, thus a sharp and non-blurred image is formed by a photographing optical system. The lens-supporting frame 20 is supported by the fixed-ring 10 in such a manner that the lens-supporting frame 20 is movable along two directions perpendicular to each other (hereinafter, represented by "X-direction" and "Y-direction").

The camera has an angular velocity detector (not shown), such as a gyro-sensor, which detects an angular velocity due to the hand tremble. The driven-amount and driven-direction of the correcting lens 30 is determined so as to cancel the hand tremble in accordance with the value of the detected angle velocity.

A driving mechanism 40 is provided at the flange 20A, and shifts the lens-supporting frame 20 along the X direction, as described later. On the other hand, a guide mechanism 60, provided opposite to the driving mechanism 40, has a supporting member 61, a shifting frame 62, and a guide axis 63. The guide mechanism 60 guides the lens-supporting frame 20 along the X direction. The supporting member 61 has a fixed-portion 61A fixed to the fixed-ring 10, and a supporting portion 61B extending along the X-direction. The shifting frame 62 is slidably supported by the supporting member 61. A driving mechanism 50, provided at the flange 20B, shifts the lens-supporting frame 20 along the Y direction, while a guide mechanism 70, provided opposite to the driving mechanism 50, guides the lens-supporting frame 20 along the Y direction.

Figure 2:
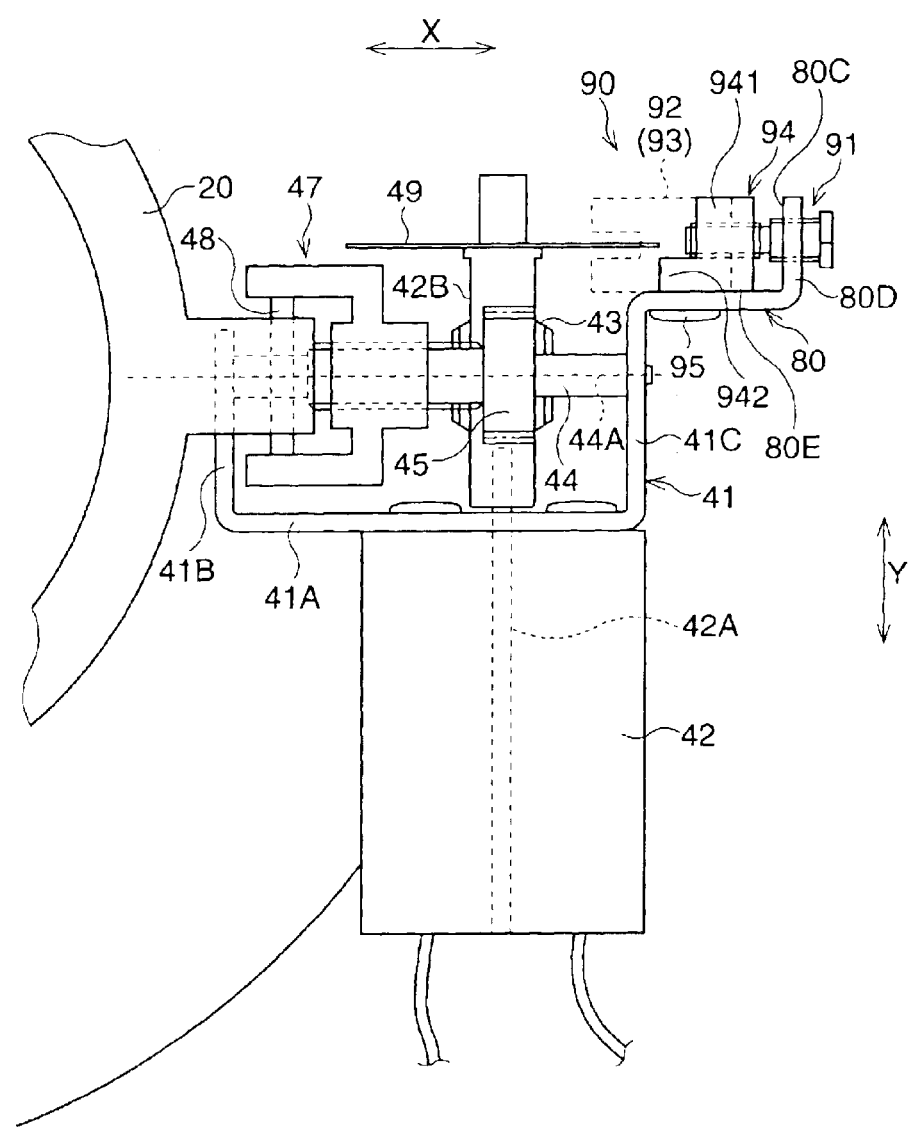
FIG. 2 is an enlarged plan view of a driving mechanism of the rotary encoder seen from the X-direction.
Figure 3:
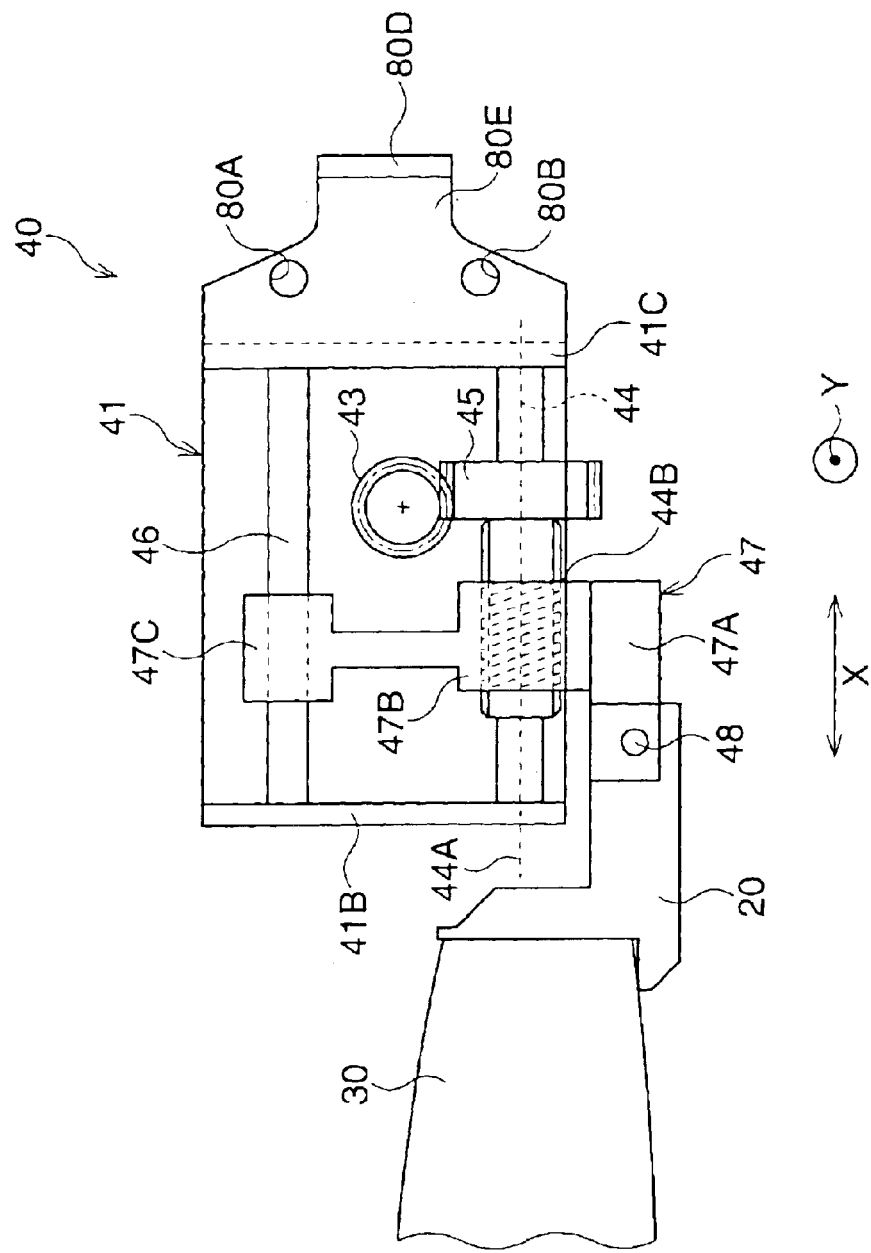
FIG. 3 is an enlarged plan view of the driving mechanism seen from the Y-direction.

FIG. 2 is an enlarged plan view of the driving mechanism 40 seen from the X-direction, and FIG. 3 is an enlarged plan view of the driving mechanism 40 seen from the Y-direction.

The driving mechanism 40 has a rotary encoder 90 with a disc 49, a pair of photo-interrupters 92, 93, a fixed-plate 41, and a DC motor 42. Note that, the rotary encoder 90 is not shown in FIG. 3. The U-shaped fixed-plate 41 is fixed to the fixed-ring 10, and an L-shaped protrusion 80 is fixed to the fixed-plate 41. The DC motor 42 is attached to the bottom portion 41A of the fixed-plate 41, and a rotating axis 42A of the motor 42 extends over the bottom portion 41A of the fixed-plate 41. A sleeve 42B is rotatably attached around the rotating axis 42A, and a worm 43 is formed around the sleeve coaxial to the rotating axis 42A. A driving shaft 44 is rotatable around an axis 44A parallel to the X-direction, and is supported by a pair of side plates 41B, 41C of the fixed-plate 41, which are parallel to each other. A worm wheel 45 is formed on the driving shaft 44 and engages with the worm 43.

A guide shaft 46 shown in FIG. 3 extends parallel to the driving shaft 44, and both ends of the guide shaft 46 are rigidly supported by the side plates 41B, 41C respectively. A shifting frame 47, which is movable along the X-direction, has a connecting portion 47A, a driven portion 47B, and a guided portion 47C. The connecting portion 47A is connected to the lens-supporting frame 20 via a guide axis 48. The driven portion 47B threadly engages with a thread portion 44B formed on the part of the outer surface of the driving shaft 44. The guided portion 47C cooperatively engages with the guide shaft 46 so as to be slidable along the guide shaft 46. When the DC motor 42 rotates, the rotating motion of the motor 42 is transmitted to the driving shaft 44 via the worm 43 and the worm wheel 45, so that the driving shaft 44 rotates around the axis 44A.

As described above, both ends of the driving shaft 44 are supported by the side plates 41B, 41C fixed to the fixed-ring 10, which prohibits motion of the driving shaft 44 along the axis 44A. Accordingly, the driven portion 47B is shifted along the X-direction in accordance with the rotation of the driving shaft 44. The motion of the driven portion 47B shifts the correcting lens 30 along the X direction.

Figure 4:
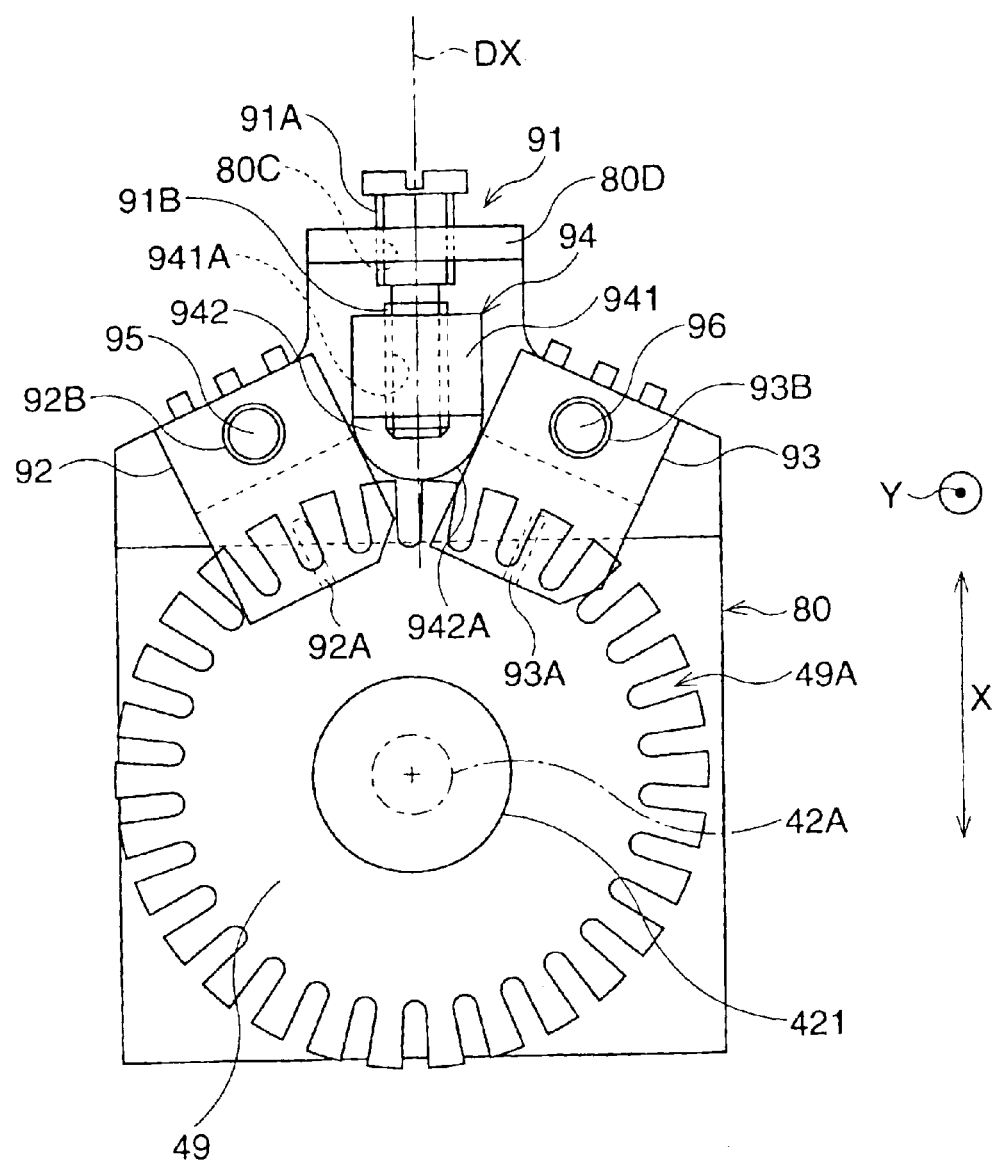
FIG. 4 is a plan view of the rotary encoder seen from the Y-direction.
Figure 5:
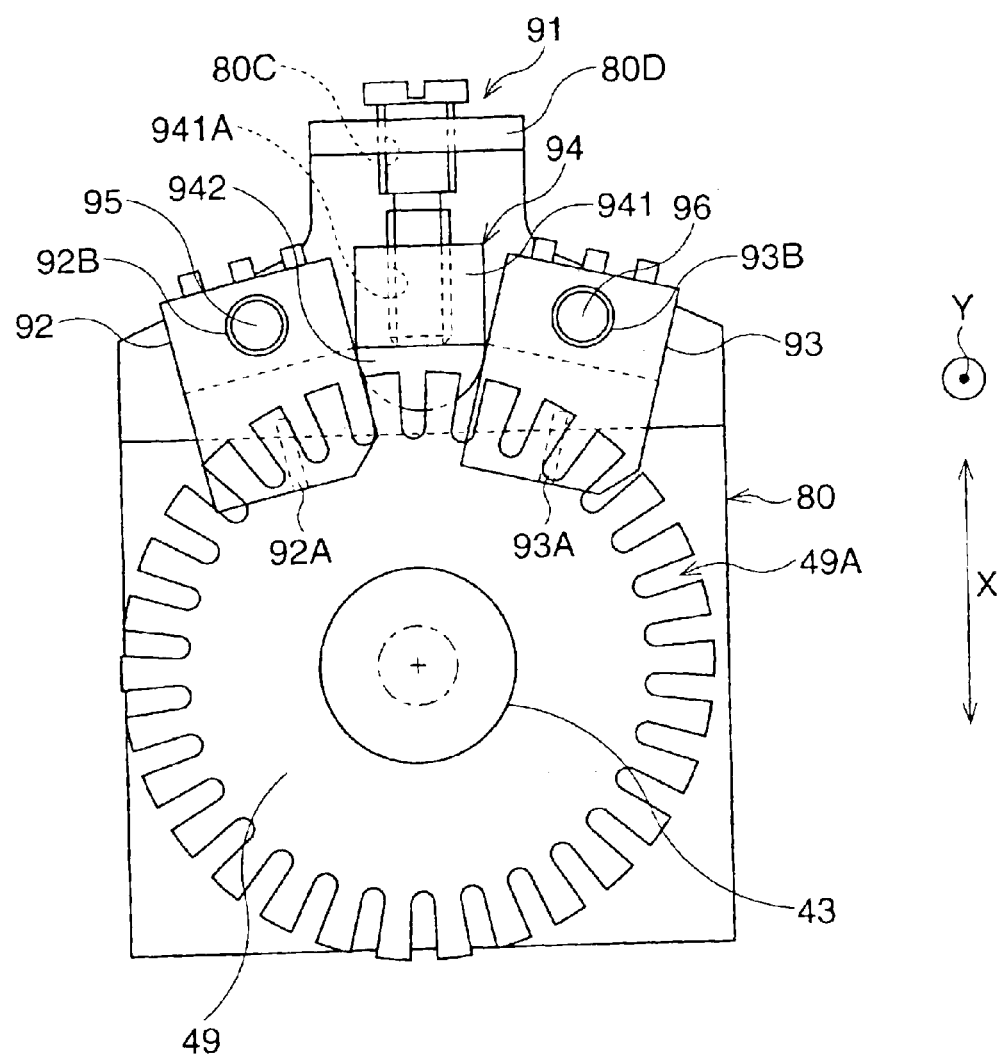
FIG. 5 is a plan view of the rotary encoder different from FIG. 4.

FIG. 4 is a plan view of the rotary encoder 90 seen from the Y-direction. FIG. 5 is a plan view of the rotary encoder 90 different from FIG. 4. With reference to FIGS. 2 to 5, the rotary encoder 90 is explained.

The rotary encoder 90 is, herein, an incremental and photo type rotary encoder, which detects a rotation position of the motor 42 by counting the rotation-amount. The disc 49 is rigidly journaled around the rotating axis 42A of the motor 42, and rotates in accordance with the rotation of the DC motor 42. The pair of photo-interrupters 92, 93 are slidably mounted on the protrusion 80. Further, an adjusting member 94 for adjusting the position of the photo-interrupters 92, 93 is slidably mounted on the protrusion 80, as shown in FIG. 2, and a shifting control screw 91 for shifting the adjusting member is attached to the protrusion 80.

As shown in FIG. 4, a plurality of slits 49A is formed circumferentially at constant intervals. The photo-interrupters 92, 93 have detecting portions 92A, 93A respectively. Each of detecting portions 92A, 93A has a U-shaped configuration (See FIGS. 1 and 2), and has an LED and a photo-diode (both not shown), which are opposite to each other. The LED continuously emits light toward the photo-diode. The photo-diodes in the detecting portions 92A, 93A receive the light from the LEDs respectively. The photo-interrupters 92, 93 are respectively positioned in such a manner that the slits 49A are put between the LED and the photo-diode. A pair of positioning holes 92B, 93B are formed in the pair of photo-interrupters 92, 93 respectively, and a pair of corresponding positioning holes 80A, 80B (See FIG. 3) are formed in the protrusion 80.

A positioning screw 95 for positioning the photo-interrupter 92 passes through the positioning holes 80A, 92B, whereas the positioning screw 96 for positioning the photo-interrupter 93 passes through the positioning holes 80B, 93B. The pair of photo-interrupters 92, 93 are respectively fastened by the positioning screws 95, 96 with a proper tightness. Namely, the photo-interrupters 92, 93 pivot around the screws 95, 96 respectively when an external force operates on the surface of the photo-interrupters 92, 93, whereas the photo-interrupters 92, 93 remain stationary when the force does not operate.

When the disc 49 rotates in accordance with the rotation of the DC motor 42, the emitted light from the LED is interrupted at regular intervals as the slits are interrupted between the LED and the photo-diode as described above. Namely, the passage of light and the interruption of light occur alternately. Consequently, pulse signals are respectively output from the two photodiodes with a phase difference. Herein, the phase difference between two pulse signals is set to ¼ cycle. The amount of rotation of the disc 49 is measured by counting a pulse number, and the rotation direction of the disc 49 is measured in accordance with the phase difference. Then, the rotation direction of the disc 49 is obtained in accordance with the amount of rotation and the rotation direction.

The adjusting member 94 is arranged between the pair of photo-interrupters 92, 93, and has a solid and rectangular-shaped screw receiving portion 941 and a generally semicircular-shaped curved portion 942. A threaded hole 941A is formed in the screw receiving portion 941, and the curved portion 942 has a curved surface 942A with a given curvature, which contacts the pair of photo-interrupters 92, 93. As shown in FIG. 2, a bottom surface of the screw receiving portion 941 and the curved portion 942 are supported by a flat surface 80E of the protrusion 80 parallel to the X-direction, and the adjusting member 94 slides on the flat surface 80E along the X-direction. The pair of photo-interrupters 92, 93 are arranged symmetrically with respect to a shifting direction DX of the adjusting member 94. Note that, the shifting direction DX is parallel to the radial direction of the disc 49, and substantially pass through the center of the disc 49.

A threaded hole 80C is formed in a lateral portion 80D of the protrusion 80, which is parallel to the Y direction. The adjusting controlling screw 91 passes through the hole 80C and the hole 941A of the screw receiving portion 941. A right hand male screw 91A is formed on a first portion of the outer surface of the shifting control screw 91, which corresponds to the hole 80C, and a left hand male screw 91B is formed on a second portion of the outer surface of the shifting control screw 91, which corresponds to the hole 941A. Furthermore, a right hand female screw is formed in the internal surface of the hole 80C, and a left hand female screw is formed in the internal surface of the hole 941A. The right hand male screw 91A engages with the right hand female screw of the hole 80C, whereas the left hand male screw 91B engages with the left hand female screw of the hole 941A. Thus, when the screw 91 is screwed by one pitch, the adjusting member 94 moves by a distance corresponding to two pitches.

When screwing the screw 91 clockwise as seen from the head of the screw 91, the screw 91 moves along the shifting direction DX in accordance with the engagement of the screw 91with the hole 80C. Consequently, the pair of photo-interrupters 92, 93 is simultaneously pressed by the curved portion 942 of the adjusting member 94 so as to be separated from each other. Then, each of the pair of photo-interrupters 92, 93 pivots to a given position, as shown in FIG. 5. In this embodiment, the delicate adjustment of the relative-position-relationship is achieved by the pivoting of the photo-interrupters 92, 93. The pivoting-amount of the photo-interrupter 92 is the same as that of the photo-interrupters 93. On the other hand, when screwing the screw 91 counterclockwise, the adjusting member 94 moves away along the shifting direction DX.

In a situation before adjusting work, the adjusting member 94 is positioned closer to the lateral portion 80D of the protrusion 80 compared to the position shown in FIG. 4, and the pair of photo-interrupters 92, 93 are more adjacent to each other compared to the arrangement shown in FIG. 4. At this time, the curved portion 942 does not contact the pair of photo-interrupters 92, 93.

When performing the adjusting work, the operator screws the screw 91 gradually to shift the adjusting member 94 toward the center of the disc 49 so that the adjusting member 94 contacts the photo-interrupters 92, 93. While screwing the screw 91, the voltage signals output from the photo-interrupters 92, 93 are monitored by using an oscilloscope. When the phase difference between two pulse signals output from the pair of photo-interrupters 92, 93 coincides with the ¼ cycle, the operator stops screwing. Then, adhesive is applied to the periphery of the screws 95, 96, and the holes 80A, 92B, 80B, 93B to fix the pair of photo-interrupters 92, 93 to the protrusion 80, thus the adjusting work is finished.

The phase difference may be set to another value instead of ¼ cycle. The shifting control member 91 may be shifted by an electronic control, or the adjusting member 94 may be shifted by an electronic shifting controller instead of the screw. The rotary encoder 75 may detect a rotation position of another rotating member, such as an actuator, instead of the DC motor. The pair of photo-interrupters 92, 93 may be arranged asymmetrically with respect to the shifting direction of the adjusting member. Furthermore, the screw direction of the hole 80C formed in the lateral portion 80C may be the same as that of the hole 941A formed in the adjusting member 94.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2002-274445 (filed on Sep. 20, 2002) which is expressly incorporated herein, by reference, in its entirety.

What is claimed is:

1. A rotary encoder comprising:

a disc that rotates around a rotating axis and comprises slits that are formed circumferentially at given intervals;

a pair of photo-interrupters that respectively have a light-emitting device and a photo-detecting device opposite each other, and that generates two signals with a phase difference, each photo-interrupter being pivotable around a pivot coaxial to the rotating axis, and each photo-interrupter being arranged along the circumferential direction of said disc so as to position the slits between the light-emitting device and the photo-detector;

an adjusting member configured to contact said pair of photo-interrupters, and configured to be movable along a shifting direction corresponding to a radial direction of said disc so as to engage said pair of photo-interrupters, said adjust member configured to adjusting a relative position-relationship between the pair of photo-interrupters associated with a phase difference; and a shifting controller configured to shift said adjusting member along the shifting direction to set the phase difference to a predetermined phase difference.

2. The rotary encoder of claim 1, wherein said adjusting member is movable between said pair of photo-interrupters, said pair of photo-interrupters being separated from each other in accordance with the engaging said adjusting member.

3. The rotary encoder of claim 2, wherein said pair of photo-interrupters is arranged so as to be symmetrical with respect to the shifting direction, such that each photo-interrupter pivots by an equal shifting-amount.

4. The rotary encoder of claim 1, further comprising a supporting member that supports said pair of photo-interrupters and said adjusting member, said adjusting member being slidable on said supporting member along the shifting direction, and said pair of photo-interrupters being pivotably mounted on said supporting member.

5. The rotary encoder of claim 4, wherein said shifting controller comprises a screw, said screw being threaded into a first threaded hole formed in said supporting member and a second threaded hole formed in said adjusting member, said adjusting member being movable by screwing said shifting controller.

6. The rotary encoder of claim 5, wherein a screw-direction of said second threaded hole is opposite of that of said first threaded hole, said screw comprising a first screw section with a screw direction corresponding to said first threaded hole and a second screw section with a screw direction corresponding to said second threaded hole.

7. The rotary encoder of claim 1, wherein each of said pair of photo-interrupters is fastened around the pivot such that each photo-interrupter moves only when said adjusting member engages therewith.

8. The rotary encoder of claim 1, wherein said adjusting member comprises a curved surface portion such that said pair of photo-interrupters is engaged simultaneously.

9. A position adjuster for a pair of photo-interrupters incorporated in a rotary encoder having a disc that rotates around a rotating axis and includes slits, said position adjuster comprising:

an adjusting member configured to contact said pair of photo-interrupters, and configured to be movable along a shifting direction corresponding to a radial direction of said disc so as to engage said pair of photo-interrupters, said adjusting member configured to adjust a relative position-relationship between the pair of photo-interrupters associated with a phase difference; and a shifting controller configured to shift said adjusting member along the shifting direction to set the phase difference to a predetermined phase difference.

10. The position adjuster of claim 9, wherein said adjusting member is movable between said pair of photo-interrupters, said pair of photo-interrupters being separated from each other in accordance with the engaging said adjusting member.

11. The position adjuster of claim 10, wherein said pair of photo-interrupters is arranged so as to be symmetrical with respect to the shifting direction, such that each photo-interrupter pivots by an equal shifting-amount.

12. The position adjuster of claim 9, further comprising a supporting member that supports said pair of photo-interrupters and said adjusting member, said adjusting member being slidable on said supporting member along the shifting direction, and said pair of photo-interrupters being pivotably mounted on said supporting member.

13. The position adjuster of claim 12, wherein said shifting controller comprises a screw, said screw being threaded into a first threaded hole formed in said supporting member and a second threaded hole formed in said adjusting member, said adjusting member being movable by screwing said shifting controller.

14. The position adjuster of claim 13, wherein a screw-direction of said second threaded hole is opposite of that of said first threaded hole, said screw comprising a first screw section with a screw direction corresponding to said first threaded hole and a second screw section with a screw direction corresponding to said second threaded hole.

15. The position adjuster of claim 9, wherein each of said pair of photo-interrupters is fastened around the pivot such that each photo-interrupter moves only when said adjusting member engages therewith.

16. The position adjuster of claim 9, wherein said adjusting member comprises a curved surface portion such that said pair of photo-interrupters is engaged simultaneously.

* * * * *